United States Patent
Janak et al.

(10) Patent No.: US 10,248,094 B2
(45) Date of Patent: Apr. 2, 2019

(54) HOT CUTOVER BOX

(71) Applicant: Cutovers, Inc., San Leon, TX (US)

(72) Inventors: Mark Janak, Friendswood, TX (US); Gary Fisher, Friendswood, TX (US); Brandon Janak, Friendswood, TX (US); Bill Lowe, San Leon, TX (US)

(73) Assignee: Key Industrial Specialists, Inc., San Leon, TX (US)

( * ) Notice: Subject to any disclaimer, the term of this patent is extended or adjusted under 35 U.S.C. 154(b) by 281 days.

(21) Appl. No.: 15/423,425

(22) Filed: Feb. 2, 2017

(65) Prior Publication Data

US 2017/0293280 A1 Oct. 12, 2017

Related U.S. Application Data

(60) Provisional application No. 62/319,072, filed on Apr. 6, 2016.

(51) Int. Cl.
*G05B 19/042* (2006.01)

(52) U.S. Cl.
CPC .. *G05B 19/042* (2013.01); *G05B 2219/23043* (2013.01)

(58) Field of Classification Search
CPC .................. G05B 19/042; G05B 2219/23043
See application file for complete search history.

(56) References Cited

U.S. PATENT DOCUMENTS

2016/0233664 A1\* 8/2016 Brudevold ................ H02J 3/12
2018/0052429 A1\* 2/2018 Ryan ...................... G05D 23/00

\* cited by examiner

*Primary Examiner* — Daniel J Cavallari
(74) *Attorney, Agent, or Firm* — Maze IP Law, P.C.

(57) ABSTRACT

The disclosed hot cutover box creates an electronic virtual bypass around a terminal strip to which existing control system, new control system, and final control element connections may be made, thereby allowing migration from an existing to a new control system to take place. Sensors allow measurement of a current signal without disrupting electrical continuity and connectors allow the hot cutover box to be introduced to the circuit with no disruption to the controller output. Once the hot cutover box is in place, wiring connections can be removed from the terminal strip as the hot cutover box effectively provides a parallel current pathway around the terminal strip.

19 Claims, 15 Drawing Sheets

HOT CUTOVER BOX

RELATION TO PRIOR APPLICATIONS

This application claims the benefit of U.S. Provisional Patent Application 62/319,072 filed on Apr. 6, 2016.

BACKGROUND OF THE INVENTION

The invention relates to the field of industrial instrumentation and controls.

Industrial process control systems consist of inputs and outputs where the inputs are signals sent from field devices (sensing elements) to an indicator or controller corresponding to a sensed process operating parameter or variable (pressure, temperature, liquid level, differential pressure, chemical composition, and the like) and the outputs are signals sent from a controller to a final control element which, by its action corresponding to an output signal, will maintain or modify the process operating parameter or variable.

Frequently there is a need to migrate a final control element from one controller to another while the process unit is in operation without causing disruption to the operating variable (a "hot cutover"). Historically, this has been effected by one of three principal methods: (1) utilizing block and bypass valves to allow a field operator to control the operating parameter manually while receiving radio or other communication from the central control room operator, while the control circuitry is being migrated from one controller to another; (2) using a pneumatic "boondoggle," a tee and valve configuration that blocks the pneumatic signal of the current to pneumatic transducer that is an always-present part of the final control element where this configuration pneumatically emulates the bypass arrangement described in (1) above; or (3) using a mechanical stem clamp to force the valve to remain in its "last" position while the circuitry is being migrated. The first two methods allow some adjustments to the final control element while the electronic migration is being done, albeit being cumbersome in that the methods require verbal communication between the control room operator and the field operator. The third method allows no adjustment to the final control element whatsoever.

DESCRIPTION OF THE DRAWINGS

The figures supplied herein illustrate various embodiments of the invention.

DESCRIPTION OF EXEMPLARY EMBODIMENTS

As will be familiar to those of ordinary skill in the electrical arts, as used herein electronic parts used for current sensors, state sensors and current measurement circuits can be implemented with numerous types of electronics, by way of example and not limitation including using optoisolators/optocouplers or hall effect sensors or the like or a combination thereof; magnetic fluxgate sensors; transformers; transistors; shunt resistor sensors; current shunt monitors; current-sense comparators; dc-dc converters; special purpose integrated circuits; or the like; or appropriate combinations thereof. Electromechanical relays can be implemented using numerous devices, by way of example and not limitation mechanical switches, transistors such as field effect transistors, electronic analog switch type relays, or the like, or a combination thereof. Electronic latch circuits may be implemented numerous ways, by way of example and not limitation using latching relays, logic integrated circuits, and the like, or a combination thereof or by software, either alone or in combination with circuitry. Software can be via any appropriate programming language such as, by way of example and not limitation, C++, Python, Ruby, Java, or the like, or a combination thereof. Accordingly, as used herein, these terms include their equivalents, e.g. "relay" is not limited to electromechanical relays and may also be implemented using mechanical switches, transistors, electronic analog switch type relays, or the like, or a combination thereof.

Figure 1:
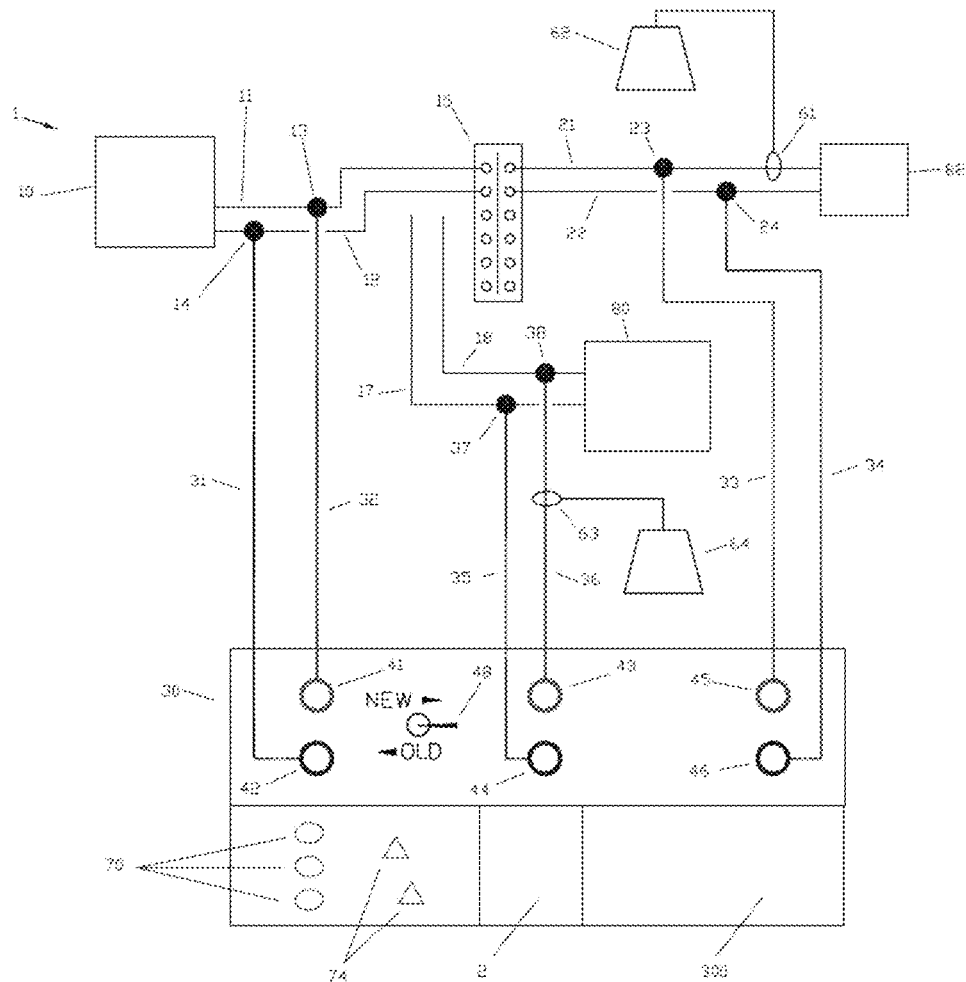
FIG. 1 is an exemplary schematic diagram showing an example of a first embodiment of a hot cutover box.

Referring now to the exemplary embodiment shown in FIG. 1, hot cutover is desired between existing process controller 10 and new process controller 80. In a first embodiment hot cutover box 1 comprises a combination of milli-ammeters 62,64, which may be Hall Effect milli-ammeters, and connectors (typically piercing connectors generally shown as callouts 13,14,23,24,37, and 38), creating an electronic virtual bypass around terminal strip 15 where migration of existing process controller 10 to new process controller 80 will take place. One or more meters 62,64 allow measurement of a source signal, e.g. a DC 5 milliamp signal, without disrupting electrical continuity. The connectors allow hot cutover box 1 to be introduced to the circuit with no disruption to the controller output. Once hot cutover box 1 is in place, wiring connections such as wiring connections 11, 12, 17, 18, 21 and/or 22 can be lifted from terminal strip 15 as hot cutover box 1 effectively provides a parallel current pathway around terminal strip 15.

Once wiring connections 11,12 from existing process controller 10 have been lifted from terminal strip 15, a hot cutover may take place such as by moving switch 48 from an "old" position to a "new" position, provided new process controller outputs 43,44 have been adjusted to match old process controller outputs 41,42. Typically, the time required for the hot cutover is reduced to a few milliseconds (the time required to throw switch 48).

In the exemplary embodiment illustrated in FIG. 1, hot cutover box 1 comprises housing 30; output 11,12 from existing process controller 10; new process control system output via connectors 17,18; current indicators 62,64 which may be Hall Effect devices where one Hall Effect current indicator 62 continuously monitors the actual signal going to final control element (FCE) 82 and current indicator 64 monitors output from new process control system 80 prior to cutting the signal over, in part to ensure matching signals and therefore bumpless cutover; at least three pairs of connectors 13 and 14, 23 and 24, and 37 and 38 which may be piercing connectors that provide electrical contact to the existing circuitry at the point where access is needed for proper functionality of all components; and a set of sufficient test leads 31, 32, 33, 34, and 35, 36 to connect the components.

Housing 30 may be made from plastic, metal, or any suitable material, and is typically configured to house internal electrical components and circuitry, as further described herein. Housing 30 may be made to be water tight and/or to generally withstand external environmental forces. Housing 30 may further comprise a plurality of connection junctions such as electrical clips, jacks, plugs, terminals and the like.

A digital multimeter (not shown in the figures) may be used to test polarity and continuity of pierced connections.

Figure 2:
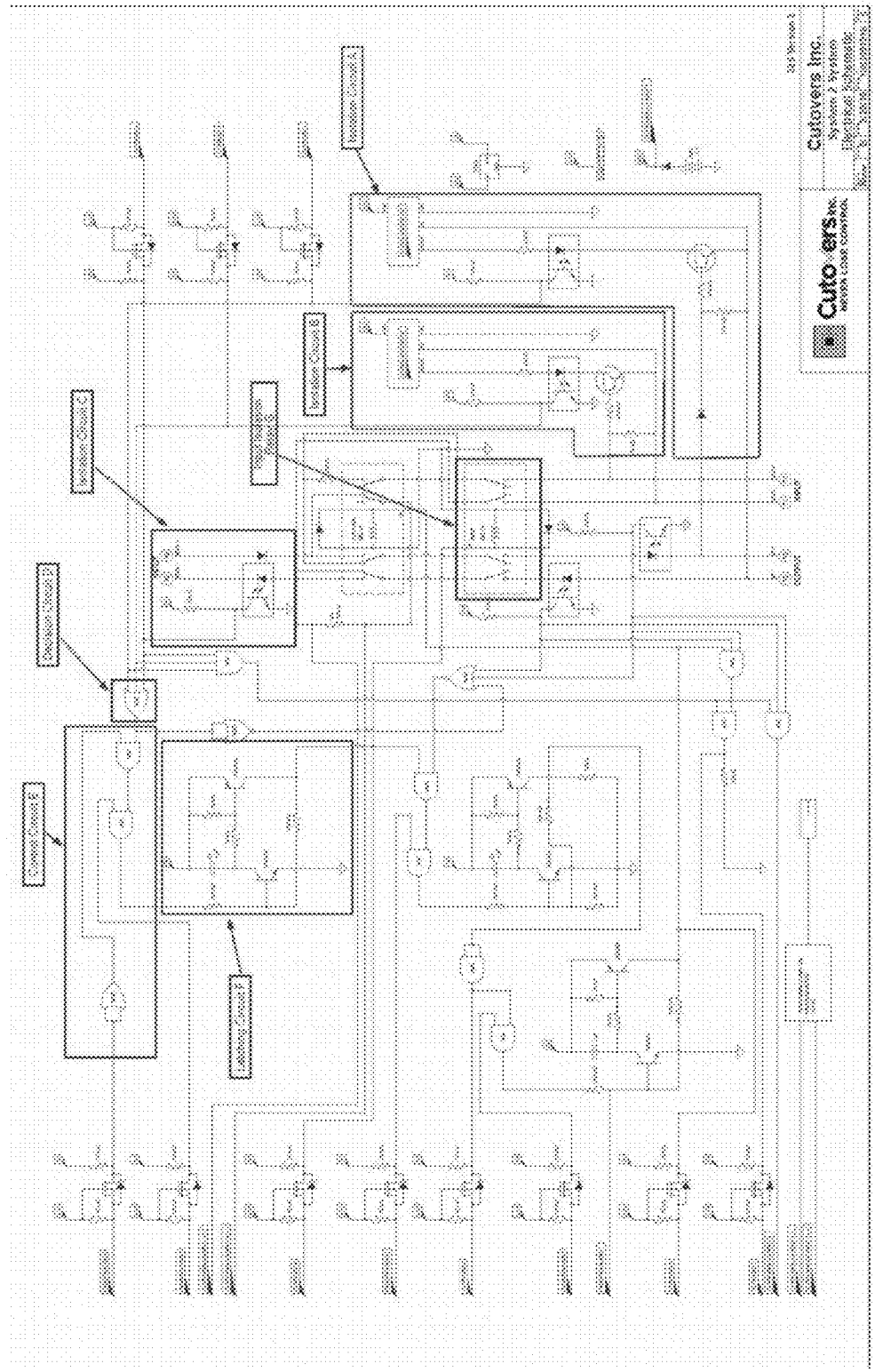
FIG. 2 is an exemplary schematic of an exemplary hot cutover box embodiment.

Referring to FIGS. 1 and 2, in this illustrative example an isolation circuit generally referred to as "A" (FIG. 2) is used to read continuity and polarity of the FCE connection without interfering with the signal. Isolation circuit A is also used by software resident in hot cutover box 1 when deciding if the software will report that the continuity and polarity of the FCE connections are acceptable. An isolation circuit generally referred to as "B" is used to read continuity and polarity of the existing process control signal without interfering with it. Isolation circuit B is also used by the software when deciding if the software will report that the continuity and polarity of the existing process control signal connections are acceptable. An isolation circuit generally referred to as "C" is used to read continuity and polarity of the replacement process control signal without interfering with it. Isolation circuit C is also used by the software when deciding if the software will report that the continuity and polarity of the replacement process control signal connections are acceptable. A decision circuit generally referred to as "D" is used to check the output of isolation circuits A, B, and C. If all three isolation circuits A, B, and C match, decision circuit D provides a positive power source used to trigger the subsequent control circuit generally referred to as "E" to trigger a latching circuit generally referred to as "F." Control circuit E is used by the software to latch latching circuit F when an operator selects a "Verify" input. Latching circuit F is used to energize an input isolation relay when permitted by control circuit E and decision control circuit D. An input isolation relay generally referred to as "G" is used to keep the FCE signal and the existing process control signal isolated from the cutover relay until their continuity and polarity are correct.

Figure 4:
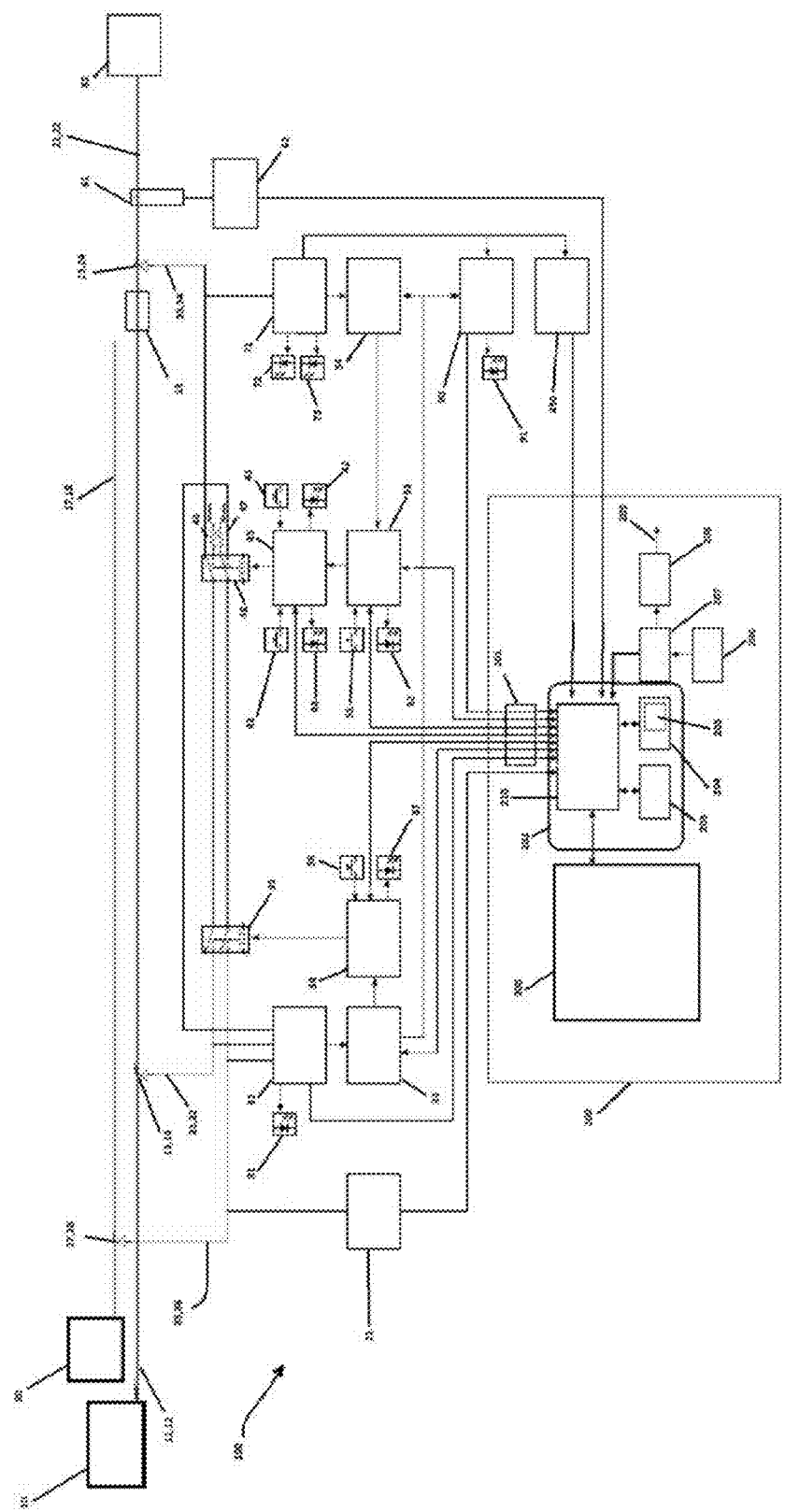
FIG. 4 is an exemplary schematic diagram showing an example of a second embodiment of a hot cutover box.

In various embodiments, sequencer 2 controls the various steps as directed by software 205 (not shown in FIG. 1 but illustrated schematically in FIG. 4). Sequencer 2 may be any appropriate device, by way of example and not limitation including a central processing unit, a field programmable array, or the like, or a combination thereof. Also, output may be directed to screen 300 or indicators 70 which may be LEDs and input received from input regions of screen 300 or switches 74 or the like.

Figure 3:
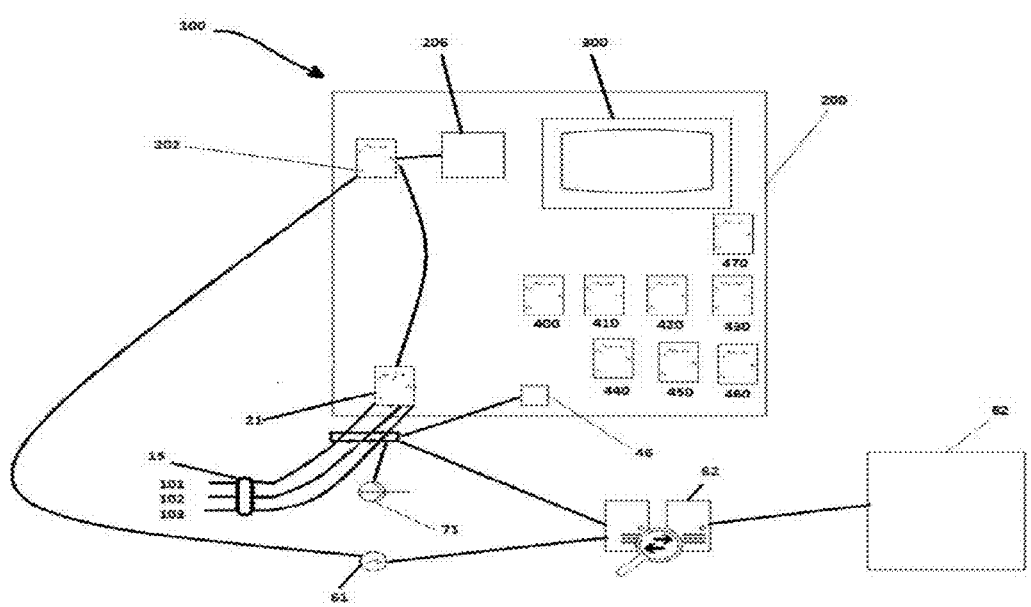
FIG. 3 is a block diagram of a second exemplary hot cutover box embodiment.

Referring now to FIG. 3, in a second embodiment hot cutover box 100 comprises housing 200; one or more power supplies 206 which may be internal, partially internal, or external to housing 200; processor 202 disposed at least partially within housing 200 and operatively in communication with power supplies 206; one or more terminal blocks 15; first current measurement circuit 21 operatively in communication with terminal blocks 15 and processor 202; cutover relay 46 operatively in communication with terminal block 15; electrical flow detector circuit 71 operatively connected to terminal block 15; a set of processing circuits 400-450, more fully described below; one or more probes 61 operatively connected to terminal block 15 intermediate terminal block 15 and one or more connections to FCE 82; process meter 62 operatively connected to probes 61 and processor 202; and display 300 operatively in communication with power supplies 206 and disposed about, and at least partially visible from, an outer portion of housing 200 where display 300 is operatively connected to processor 202.

As before, housing 200 typically comprises a metal such as aluminum or a plastic or the like, is configured to house various internal electrical components and circuitry, as described below, and may be made to be water tight or to generally withstand external environmental forces.

Referring additionally to FIG. 4, one or more of power supplies 206 may comprise one or more batteries 207, which may be rechargeable batteries 207. If rechargeable batteries 207 are present, battery charger 206 may also be present and operatively in communication with one or more of such rechargeable batteries 207. Further, voltage regulator 208 may be present and operatively in communication with one or more of the rechargeable batteries 207. In addition, system battery condition indicator 330 (FIG. 5) may be present and operatively connected to rechargeable batteries 207 to indicate the state of rechargeable batteries 207, e.g. amount of remaining battery power.

In a typical embodiment, processor 202 comprises one or more central processing units (CPU) 210; memory (not shown), e.g. random access memory or the like, operatively in communication with CPU 210; datastore 204, e.g. hard disks and/or solid state memory devices or disks or microSD devices or the like, operatively in communication with CPU 210; and software 205 typically stored on datastore 204.

Software 205 typically comprises sequencer logic configured to interrogate each of the set of processing circuits 400-450 (FIG. 3) and enable an ordered process step from a set of ordered process steps only when a set of one or more predetermined conditions exists with respect to the set of processing circuits 400-450; display logic configured to present a predetermined set of visual indicators within a predefined set of display regions 310-332 (FIG. 5) based on a currently allowed ordered process step from the set of ordered process steps; and user input logic configured to accept a user input from a set of selectable user inputs. Software 205 is also typically operative to energize switch circuit 45 to energize cutover circuit relay 46. Although software 205 operates cooperatively with the various processing circuits 400-450 to effect control, along with optional user input, one of ordinary skill in the electronic controls art will recognize that the various sequencing can be accomplished equivalently using processing circuits 400-450 alone or in combination with additional electronic circuitry.

Referring still to FIG. 4, terminal block 15 is typically operatively connected to an existing process control signal such as via a set of existing process control signal connections 11,12 and comprises a set of FCE connections 21,22 and a set of new process control signal connections 17,18. Each set of new process control signal connections 17,18 typically consists of two such connections. In certain embodiments, a set of existing process signal leads 31,32 are configured to be removably connected to the set of existing process control signal connections; a set of new process signal leads 35,36 are configured to be removably connected to the new process set of connections; and a set of FCE connection leads 33,34 are configured to be removably connected to the FCE set of connections.

Each of existing process signal leads 31,32, new process signal leads 35,36, and FCE connection leads 33,34 may comprise a set of piercing connectors and/or banana plugs or the like or a combination thereof.

The set of processing circuits 400-450 typically comprises bootup circuit 400 operatively in communication with power supply 206; verification circuit 410 operatively in communication with power supply 206; removal process circuit 420 operatively in communication with power supply 206; switch circuit 430 operatively in communication with power supply 206 and latching removal circuit 53; connection circuit 440 operatively in communication with power supply 206; and backout logic circuit 450 operatively in communication with electrical flow detector circuit 71, power supplies 206, processor 202, and state sensor 32. Electrical flow detector circuit 71 may further comprise one or more current sensors and two or more current flow visual indicators 72 and 73, which may be a light source such as an LED, operatively in communication with the one or more current sensors. In certain embodiments, match processing circuit 470 may be present to aid in a match step processing step, by way of example and not limitation such as by being able to monitor current levels presented by existing process controller 10 and new process controller 80 such as at their respective measurement points and, if an active circuit, provides the operator a method to adjust the signal from new process controller 80 to match the signal from existing process controller 10 before further processing is allowed. In certain embodiments, electronics logic such as match processing circuit 470 could be used to augment and/or replace the logic function software 205 is performing in the match step, e.g. matching of the existing process controller signal with the new process controller signal before further processing is allowed.

Bootup circuit 400 typically comprises one or more state sensors 32 and bootup state circuit 33. State sensors 32 are typically operatively in communication with processor 202, the set of new process control signal connections 17,18, the set of existing process control signal connections 11,12, and the set of FCE connections 21,22. Bootup state circuit 33 is typically operatively in communication with processor 202 and state sensor 32. At least one state sensor 32 is typically operative to sense electrical continuity or polarity.

In some embodiments, bootup circuit 400 further comprises state visual indicator 31 operatively in communication with state sensor 32. In such embodiments, state sensor 32 further comprises selectively visible continuity indicator 31, e.g. a light source such as an LED, operatively connected to processor 202 and selectively visible polarity indicator 31 operatively connected to processor 202.

Verification circuit 410 typically comprises one or more verification circuit latches 34 and verify input relay 35. Verification circuit latches 34 are typically operatively in communication with processor 202, the set of new process control signal connections 17,18, the set of existing process control signal connections 11,12, the set of FCE connections 21,22, and bootup circuit 400. Verify input relay 35 is typically operatively in communication with one or more verification circuit latches 34, the set of new process control signal connections 17,18, the set of existing process control signal connections 11,12, and the set of FCE connections 21,22.

Verification circuit 410 may further comprise verify push button 36 operatively in communication with verification circuit latch 34 and verify push visual indicator 37, which may be a light source such as an LED, operatively in communication with verification circuit latch 34. In some embodiments, verification circuit latch 34 and the remainder of the verification circuit logic may not be present and be replaced by software 205 where processor 202 provides the required verify logic and verify latching function, thereby providing the same functionality.

Removal process circuit 420 typically comprises removal logic circuit 54, latching removal circuit 53, and switch circuit 430. Removal logic circuit 54 is typically operatively in communication with electrical flow detector circuit 71, one or more verification circuit latches 34, and state sensor 32. Latching removal circuit 53 is typically operatively in communication with processor 202.

Removal process circuit 420 may further comprise remove switch button 51 operatively in communication with latching removal circuit 53 and remove switch visual indicator 52, which may be a light source such as an LED, operatively in communication with latching removal circuit 53. In some embodiments, removal logic circuit 54 and latching removal circuit 53 may not be present and be replaced by software 205 where processor 202 provides the removal logic and removal latching function, thereby providing the same functionality.

Switch circuit 430 is typically operatively in communication with power supplies 206 and latching removal circuit 53 and typically comprises one or more latching switch circuits 45 operatively in communication with cutover relay 46, processor 202, and latching removal circuit 53. Switch circuit 430 may further comprise new process switch button 43 operatively in communication with latching switch circuit 45; new process switch visual indicator 44, which may be a light source such as an LED, operatively in communication with latching switch circuit 45; existing process switch button 41 operatively in communication with latching switch circuit 45; and existing process switch visual indicator 42, which may be a light source such as an LED, operatively in communication with latching switch circuit 45. In some embodiments, latching switch circuits 45 may not be present and be replaced by software 205 where processor 202 provides the switch logic and switch latching function, thereby providing the same functionality.

Removal process circuit 420 is typically energized only when the set of existing process signal leads 11,12 have been removed from terminal block 15.

Connection circuit 440 typically comprises connection logic circuit 90 operatively in communication with removal logic circuit 54, processor 202, electrical flow detector circuit 71, and state sensor 32. Connection circuit 440 may further comprise connection status visual indicator 91, which may be a light source such as an LED, operatively in communication with connection logic circuit 90. In some embodiments, connection logic circuit 90 may not be present and be replaced by software 205 where processor 202 provides the connection logic function, thereby providing the same functionality.

Figure 5:
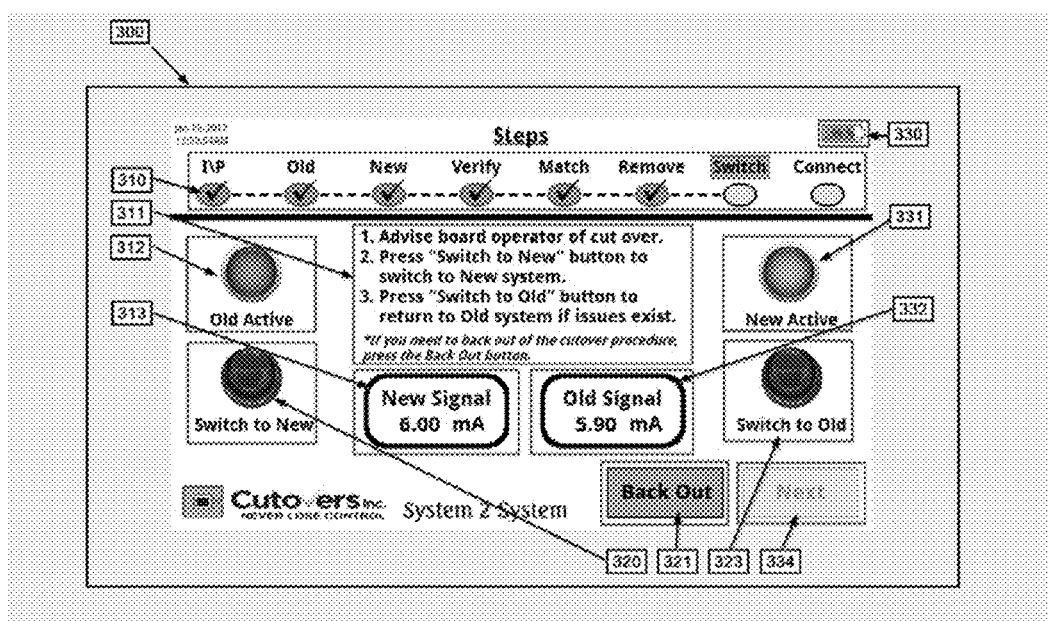
FIG. 5 illustrates an exemplary display.

Referring additionally to FIG. 5, display 300, which may be a liquid crystal display (LCD), light emitting diode (LED), or similar display or touch sensitive screen which further typically comprises a touch sensitive surface such as a PanelPilotAce™ Touch Screen Computer ("PPA") marketed by Lascar Electronics Inc. US, of Erie, Pa., and generally comprises a plurality of predefined input regions 320,321,323 and a plurality of predefined output regions 310,311,312,313,330,331,332.

The predefined set of input regions 320,321,323 typically comprises first input region 334 which, when hot cutover box 1 is in a predetermined state, is operative to allow an operator to proceed to a predetermined process step; a second input region 320 which is operative to permit energizing switch circuit 45 when the set of existing process signal leads have been removed from terminal block 15; and third input region 323 which is operative to de-energize switch circuit 45 and turn off cutover relay 46, thereby allowing the operator to switch back to an existing process control signal.

The predefined set of output display regions 310,311,312, 313,330,331,332 typically comprises first display region 310 operative to indicate when various conditions are met such as verification circuit 410 being energized and an operator is allowed to proceed to a second predetermined process step; second display region 331 operative to indicate when switch circuit 45 is energized; third display region 312 operative to indicate that energizing cutover relay 46 is allowed, where energizing cutover relay 46 switches FCE 82 away from old process control signal connections 11,12 to new process control signal connections 17,18.

Additionally, other display regions may be part of display region 310 such as a fourth display region operative to indicate when the set of new process signal leads has been connected to the set of new process signal connections 17,18 and a set of connector leads, which may be piercing leads, have been unplugged and also to signal that the operator is allowed to proceed to a third predetermined process step. A fifth display region may be present and operative to indicate when the set of new process signal leads have been connected to the set of new process signal connections 17,18 and a set of the connector leads, which may be piercing connector leads, have been unplugged and to visually indicate that the operator is allowed to proceed to a fourth predetermined process step.

Sixth display region 311 is typically configured to display a predefined set of user prompts. Display regions 313 and 332 may be used to indicate current levels in existing process control signal connections 11,12 and new process control signal connections 17,18.

In most embodiments, one or more of the first through sixth display regions may be coextensive, overlap, or be the same display region.

Figure 6:
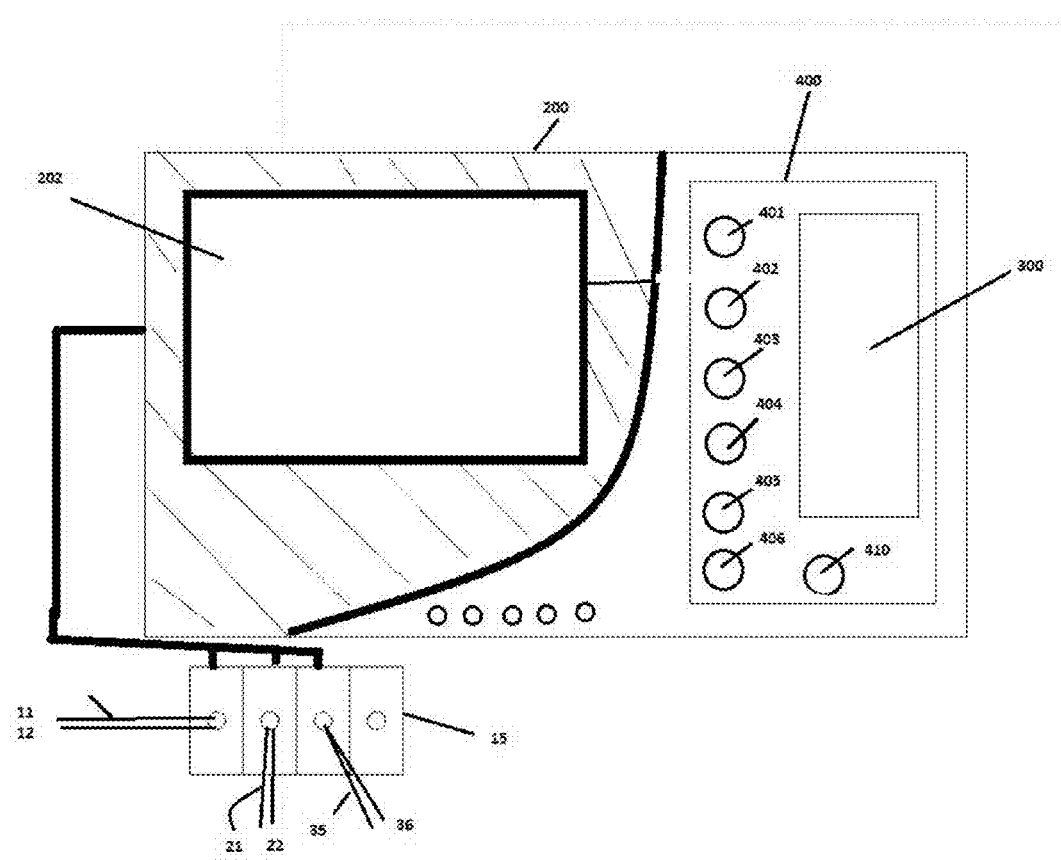
FIG. 6 is a partial cutaway view in partial perspective illustrating use of alternative indicators and inputs.

In certain embodiments, other indicator regions such as 401-406 (FIG. 6) may further comprise a set of separate LEDs or the like disposed at least partially in housing 200. These indicator regions 401-406 may be used in addition to and/or in lieu of one or more other output display regions 310,311,312,313,330,331,332.

In addition, one or more external clamp-on process meters 62 (FIG. 3) may be present and operative to measure a current value, which may be in the milliamp range, of existing process control signal 11,12 and be operatively in communication with processor 202. However, in other contemplated embodiments an external clamp-on process meter may be augmented and/or replaced with circuitry to measure the level of the current signal from existing process controller 10 without relying on a clamp. In such embodiments, one way this can be done is performance of a remove step before a match step to cause current to flow through hot cutover box 1,100 to allow measurement circuitry to measure the current signal of the signal from existing process controller 10 and use the measured signal as a signal to be compared in the match step which is as described below. In a different embodiment, circuitry in hot cutover box 1,100 can provide the clamp-on meter functionality without changing the order of the steps.

Bypass resistor 47, which may comprise a 250 ohm resister or any value appropriate to accommodate a signal from the industrial process or field wiring or final control elements, may be present and operatively in communication with processor 202 used by software 205 to calculate the current characteristic of new process signal 17,18. Each of the two bypass resistors 47,48 may be operatively connected to new process control signal connections 17,18 and existing process control signal connections 11,12 to serve as a temporary, e.g. dummy, load when one or more process control signals are not connected to FCE 82, which can be the case at different steps of the cutover process.

Data port 203, by way of example and not limitation a USB port, may be present and operatively in communication with CPU 210.

In certain embodiments, a predetermined set of level shifters 201 is present and operatively disposed intermediate CPU 210 and a predetermined subset of circuits of the set of processing circuits 400-450.

Referring back to FIG. 3, in certain embodiments data transmitter 460 may be present and operatively in communication with processor 202. Data transmitter 460 may comprise a transceiver and may be wired or wireless. Where data transmitter 460 is present, software 205 typically further comprises data command logic adapted to receive one or more instructions and/or data via data transmitter 460 and effect a process step in response to the received instruction.

Software 205 may further comprise data logger logic operatively in communication with the CPU 210 for transmittal to a remote and/or requesting device such as using data transmitter 460.

Other contemplated embodiments of hot cutover box 2, 200 are not limited to a single input relay/cutover relay orientation or wiring configuration. The actual cutover relays and/or input verification relays can be connected to FCE 82 and connections from process control systems 10,80 in different ways, e.g. three different ways which involve three associated methods to accomplish the same functionality.

In the operation of an exemplary embodiment, effecting a hot cutover using hot cutover box 1 or 100, as have been described above, comprises requiring a connection between first set of input connectors 45,46, terminal block 15 and existing wires 21,22 with an FCE, e.g. FCE 82.

Referring additionally and generally to FIGS. 7-24, software 205 typically monitors the power signal condition and disallows progress if battery condition is not safe for the hot cutover to proceed.

Figure 7:
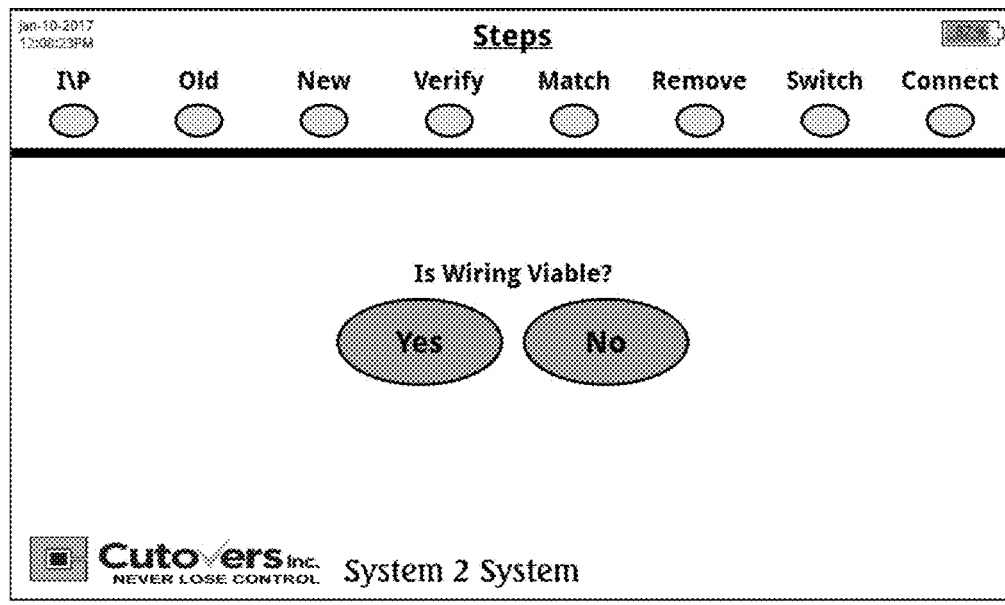
FIGS. 7-24 illustrate exemplary displays and prompts as well as exemplary sequencing.
Figure 8:
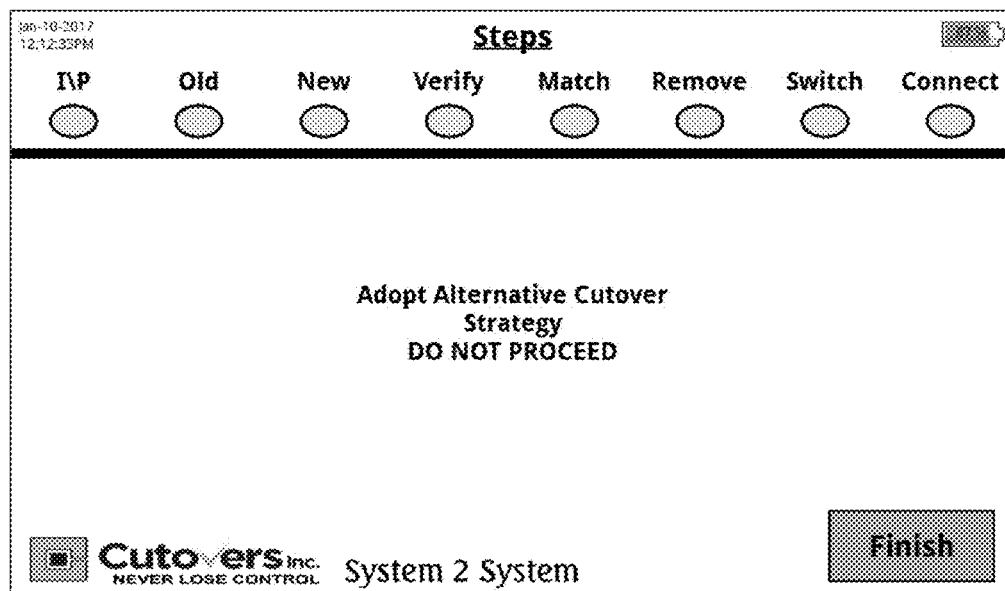

With respect to the steps below, software 205 operates cooperatively with processing circuits 400-450 and/or user input in addition to display 300. Thus, one of ordinary skill in the electronic controls arts will understand that, as used herein, the software steps can be accomplished using software 205, the various electronic circuits such as processing circuits 400-450, or a combination thereof. Software 205 may check for wiring viability and require operator verification of wiring viability, such as illustrated in FIG. 7. One or more verification prompts may be presented at display region 311 and operator input sought via, e.g., input region 321.

Figure 9:
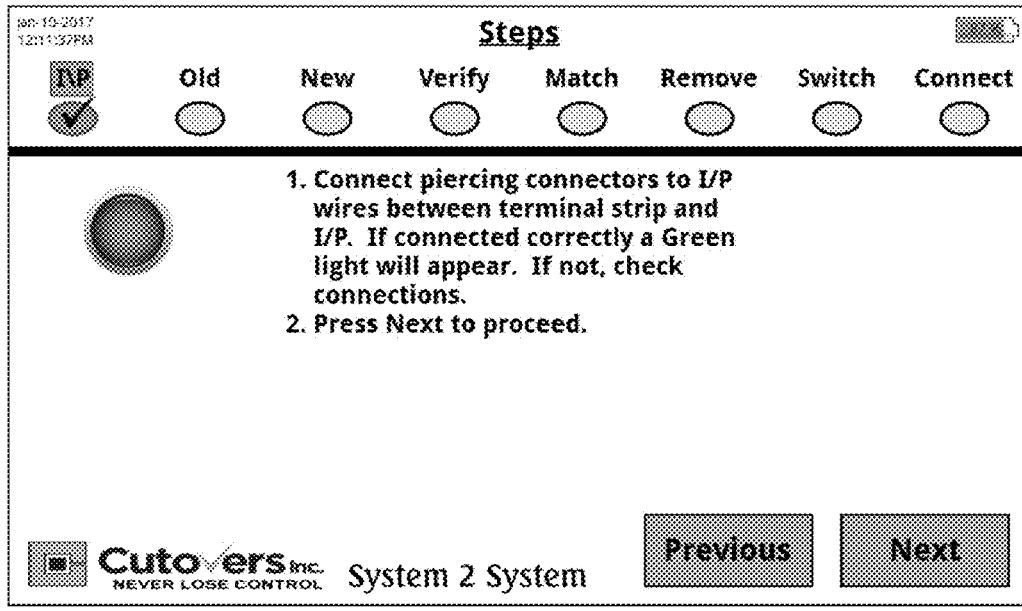
Figure 10:
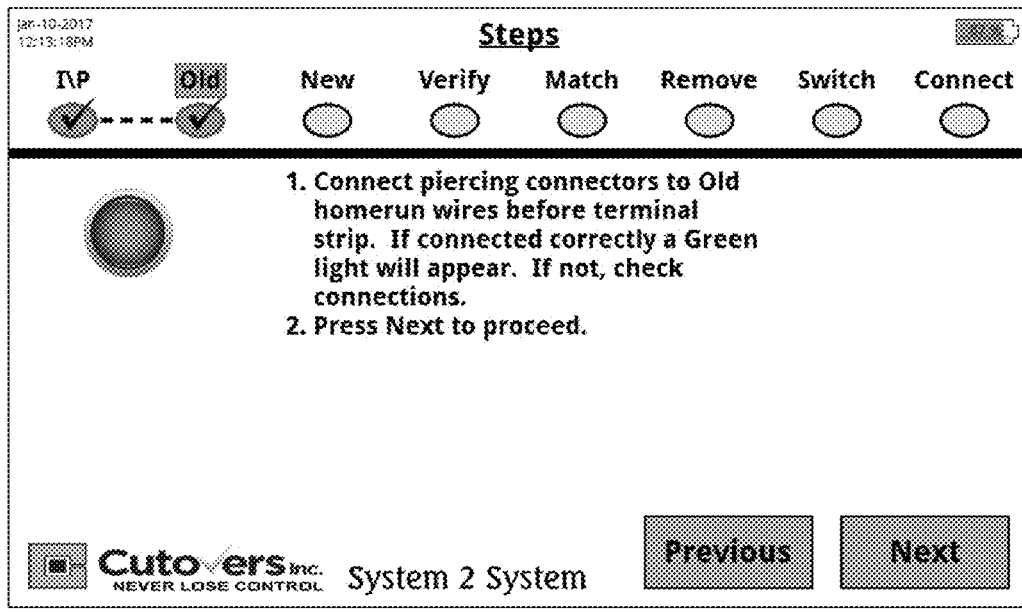

During the first illustrated step, illustrated as "I/P" at FIG. 9, hot cutover box 1, 100 is used to verify electrical continuity and signal polarity on removably connected connectors 23,24, which may be piercing connectors, and test leads 33,34 connecting circuitry in hot cutover box 1 or 100, as described herein, to a process signal being supplied to FCE 82 side of terminal block 15. Software 205 is also used to determine one or more predetermined electrical characteristics of the existing process control signal being supplied to the FCE 82 side of terminal block 15, e.g. voltage, polarity and/or current.

Software 205 also determines if the existing process control signal being supplied to the FCE 82 side of terminal block 15 connectors 45,46 is properly connected to processor 202.

If the existing process control signal being supplied to the FCE 82 side of terminal block 15 connectors 45,46 are not operatively and properly in communication with processor 202, software 205 causes an alert to be displayed in one or more predetermined display output regions, e.g. 310 and/or 311 and/or 312, and/or 334 and disallows further processing, as illustrated in FIG. 5, display input region 334. In certain situations, one or more input regions may be hidden or otherwise rendered inoperable by software 205 if software 205 is seeking to disallow further processing and rendered visible and/or operative when software 205 is seeking to allow further processing.

However, if the existing process control signal being supplied to the FCE 82 side of terminal block 15 connectors 45,46 are operatively and properly in communication with processor 202, software 205 causes a prompt to be displayed in one or more predetermined display output regions, e.g. 310 and/or 311 and/or 312, and/or 334, and allows further processing. As illustrated in FIG. 9, one or more prompts may be displayed at output region 311 and operator input may be required, e.g. at input region 321, before proceeding to a new step. As with most if not all steps, progress may be indicated in output display region 310.

A further processing step, e.g. "Old," typically comprises requiring an operator or other process to effect a connection between second set of input connectors 41,42 on hot cutover box 1, 100 to wires 11,12 between existing terminal block 15 and existing wires with existing control system 10. Software 205 verifies electrical continuity and signal polarity on removably connected piercing connectors 13,14 and test leads 31,32 connecting circuitry in hot cutover box 1,100 to process signal 11,12 being supplied to existing control system 10 side of terminal block 15. If the process control signal being supplied to existing control system 10 side of terminal block 15 connectors 41,42 are not operatively and properly in communication with processor 202, software 205 causes an alert to be displayed in one or more display output regions and disallows further processing. If the process control signal being supplied to connectors 41,42 for existing control system 10 of terminal block 15 are operatively and properly in communication with processor 202, software 205 causes an prompt to be displayed in display output region 311 and 312 and allows further processing.

Figure 11:
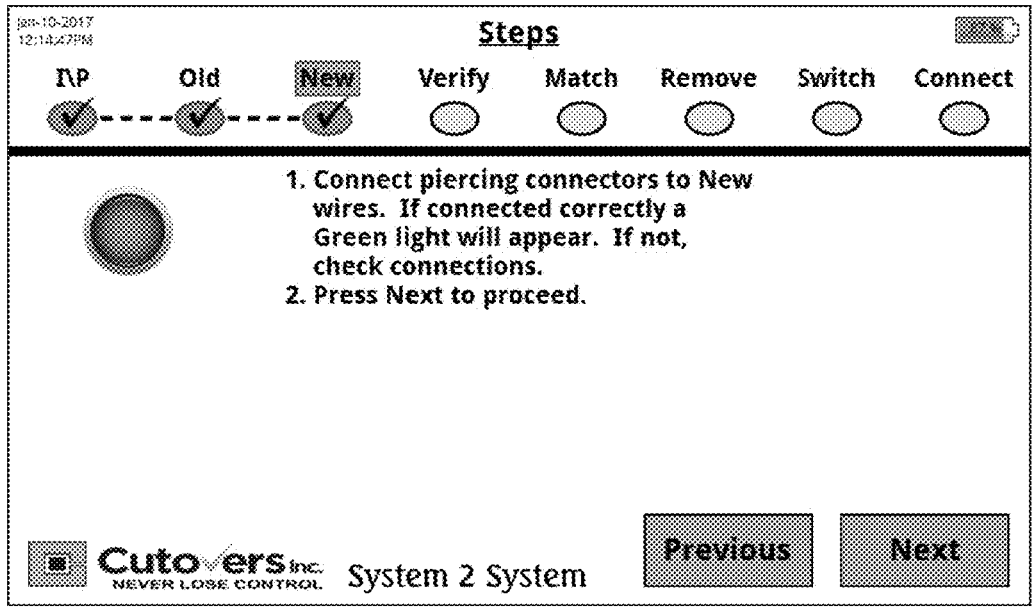

The further processing, e.g. "New" step as illustrated in FIG. 11, typically comprises requiring a connection between a third set of input connectors 43,44 to wires 35,36 to be connected to terminal block 15 from new control system 80. Software 205 verifies electrical continuity and signal polarity on removably connected piercing connectors 37,38 and test leads 35,36 connecting hot cutover box 1,100 to wires 17,18 to be connected to terminal block 15 from new control system 80. If the process control signal on wires 17,18 to be connected to terminal block 15 from new control system 80 connectors 43,44 are not operatively and properly in communication with processor 202, software 205 causes an alert to be displayed in one or more display output regions and disallows further processing. However, if the process control signal on wires 17,18 to be connected to terminal block 15 from new control system 80 connectors 43,44 are operatively and properly in communication with processor 202, software 205 causes an prompt to be displayed such as in display output region 311, 312 and 334 and allows further processing of a verify step.

Figure 12:
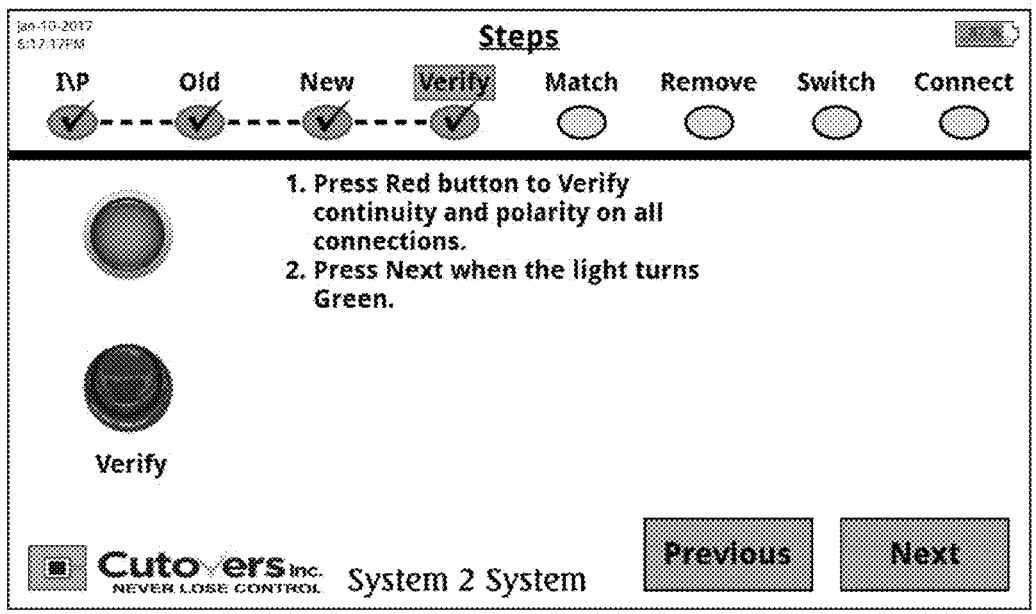

The verify step, as illustrated in FIG. 12, typically comprises using software 205 to cause one or more instructions to be displayed on display output region 311 instructing the operator to press an input region such as input region 320 to cause software 205 to monitor one or more sensed electrical characteristics. If the monitored sensed electrical characteristics are within a predetermined set of sensed electrical characteristics, which re-verifies that all connections made in the previous steps are still in communication with processor 202, and if the monitored sensed electrical characteristics are still in communication, processor 202 causes a prompt to be displayed in display output region 311, 312 and 334 and allows "match" step processing.

In certain embodiments, the verify step causes verify latching circuit 34 to latch if allowed by state sensor 32 and verify logic circuit 33. When verify latching circuit 34 latches, it engages input relay 35, causing the connections with FCE 82 and the connections with existing process control system 10 to be attached to cutover relay 46. At this point, cutover relay 46 and verify input relay 35 provide a parallel pathway around terminal block 15 for FCE 82 to connect with old process control system 10. Even though this alternative pathway around terminal block 15 exists through hot cutover box 1, 100, the signal from existing control system 10 controlling the FCE 82 is not yet passing through the hot cutover box 1,100 or through input relay 35 and/or cutover relay 46 but the signal is still passing through the terminal block. Meanwhile the process control signal to be connected to FCE 82 from new control system 80 has been temporarily connected to bypass resistor 47 using other contacts on cutover relay 46. Bypass resistor 47 is providing a temporary "dummy" load to new control system 80 and sets up the connection for transfer to FCE 82 at a later step. At this point bypass resistor 47 also allows software 205 to measure a voltage drop across bypass resistor 47 and convert it to a milliamp reading such as for new process control system 80.

Figure 13:
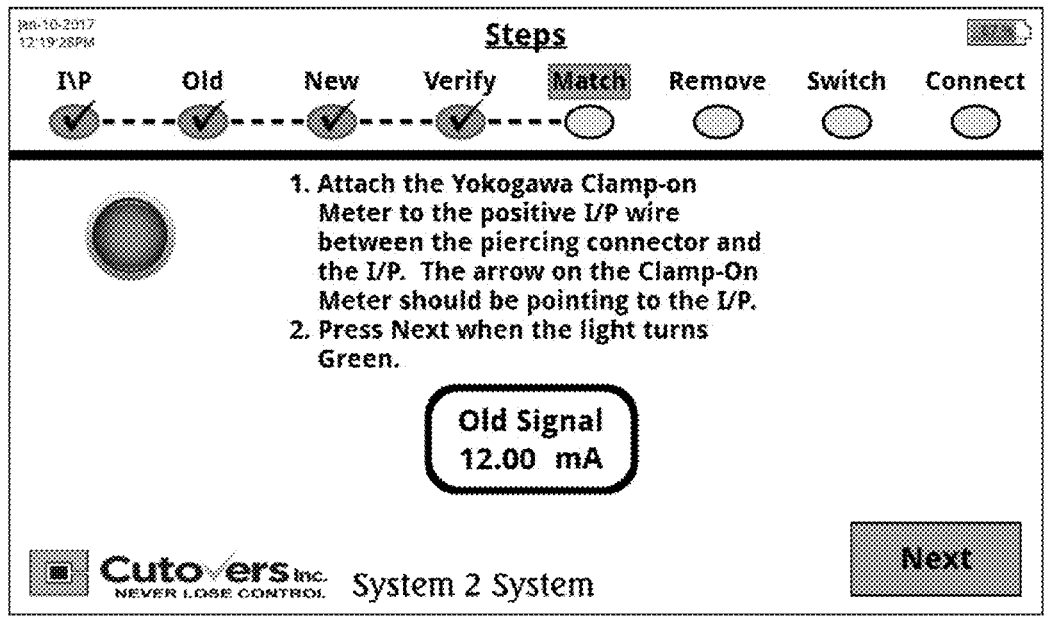
Figure 14:
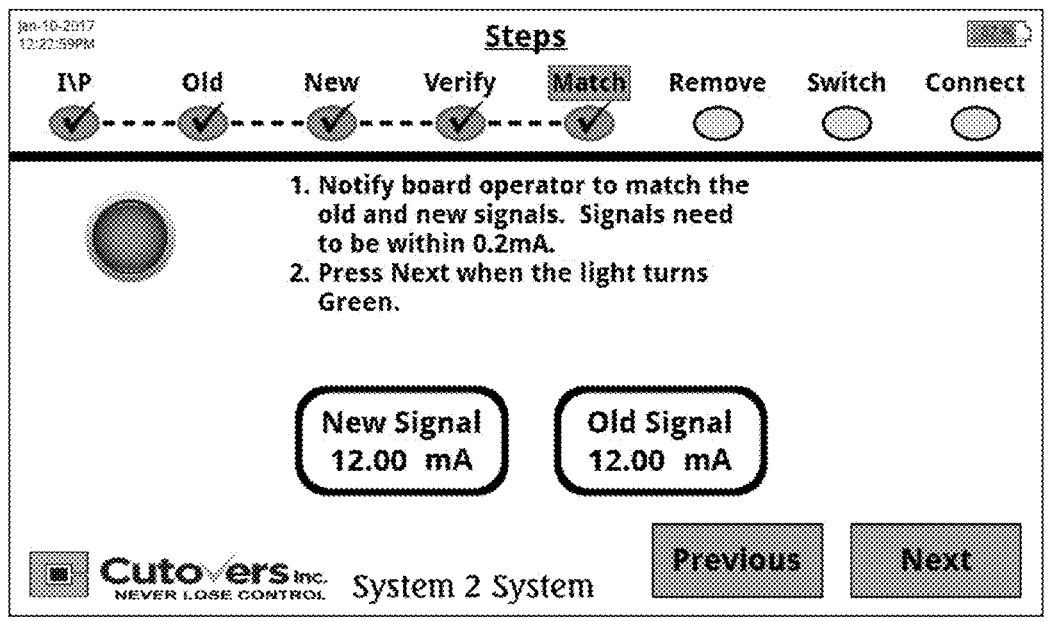

The match step, referring to FIG. 13, typically comprises using software 205 to monitor one or more sensed electrical characteristics and, if the monitored sensed electrical characteristics are within a predetermined set of sensed electrical characteristics, using software 205 to cause one or more prompts to be displayed on display output region 311, 312 and 334 indicating to the operator that clamp-on meter 62 is connected properly. Referring additionally to FIG. 14, the match step typically comprises using software 205 to monitor one or more sensed electrical characteristics and, if the monitored sensed electrical characteristics are within a predetermined set of sensed electrical characteristics, using software 205 to cause one or more prompts to be displayed on display output region 311, 312 and 334 indicating to the operator that the new process control system signal matches the old process control system signal. When the new process control system signal matches the old process control system signal, software 205 causes a one or more prompts to be displayed in display region 311,312 and 334 and allows for removal processing.

Figure 15:
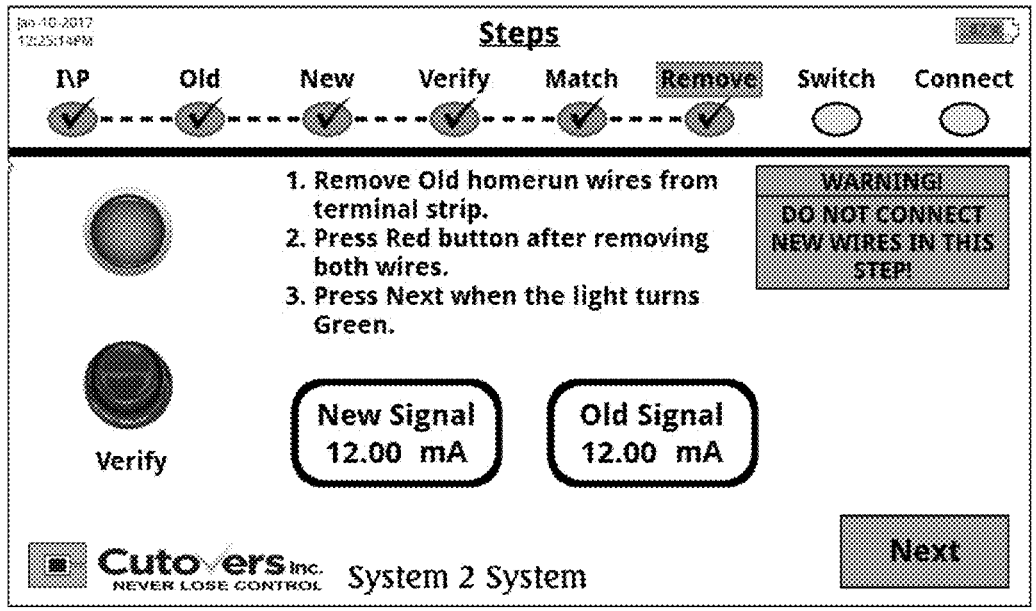

The removal step, as illustrated at FIG. 15, typically comprises prompting the operator for removal of old process control signal wires 11,12 from terminal block 15 and using software 205 to monitor one or more sensed electrical characteristics. If the monitored sensed electrical characteristics are within a predetermined set of sensed electrical characteristics, software 205 causes an alert to be displayed in display output region 311, 312 and 334 indicating to the operator the old process control signal wires have been successfully removed from terminal block and then and allows a switch step. At this point the process control signal from existing control system 10 has been redirected away from terminal block 15 and is now passing through hot cutover box 1,100 through input relay 35 and cutover relay 46 back to FCE 82 without an interruption to the control signal being supplied to FCE 82 from existing control system 10. In currently contemplated preferred embodiments existing control system 10 never loses control of FCE 82 during the removal step.

Figure 16:
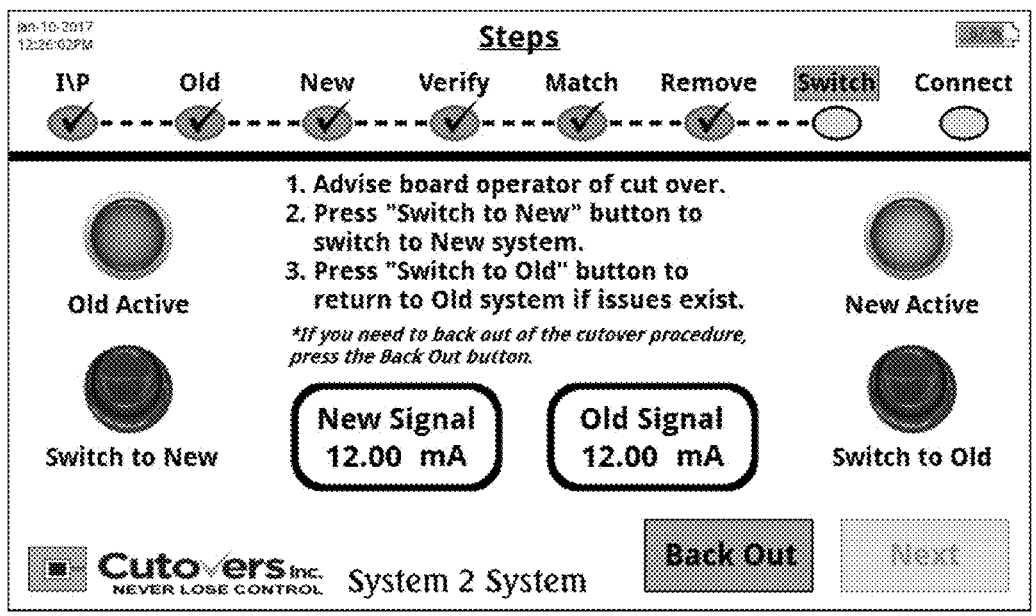

At the beginning of the switch step, referring to FIG. 16, all connections, signal levels, and signal polarity have been verified by software 205 and the various logic circuits as described herein. Thus, at this point, continuity and polarity have been verified for all connections made between hot cutover box 1, 100 and the FCE side of the terminal block 15; all connections made between hot cutover box 1, 100 and existing control system side of terminal block 15; and all of the connections between hot cutover box 1, 100 and the connections made to the signal wires to be connected to terminal block 15 from new control system 80. In addition, matching of current levels between existing control system 10 and new control system 80 has been verified and removal of existing control system signal wires from terminal block 15 has been verified. Existing control system 10 is still in control of FCE 82.

During the switch step, still referring to FIG. 16, software 205 typically causes a prompt to be displayed in display output region 311 requesting that the operator push a "switch to new" button, e.g. input region 320 or switch 48 (FIG. 1). When a switch to new button is pushed, the control signal being supplied to FCE 82 is moved from existing control system 10 to new control system 80. When the control signal being supplied to FCE 82 is moved from existing control system 10 to new control system 80 FCE 82 maintains its current position, reading, instruction, and the like. Software 205 may then display an alert and/or prompt in one or more display regions such as display output region 311 and 334 and allows for connect processing.

In the switch step, the operator can also press a "Switch to Old" button such as input region 323 to switch back to existing process control system 10 or a "Back Out" button such as input region 321 to safely back out of the hot cutover process.

Figure 17:
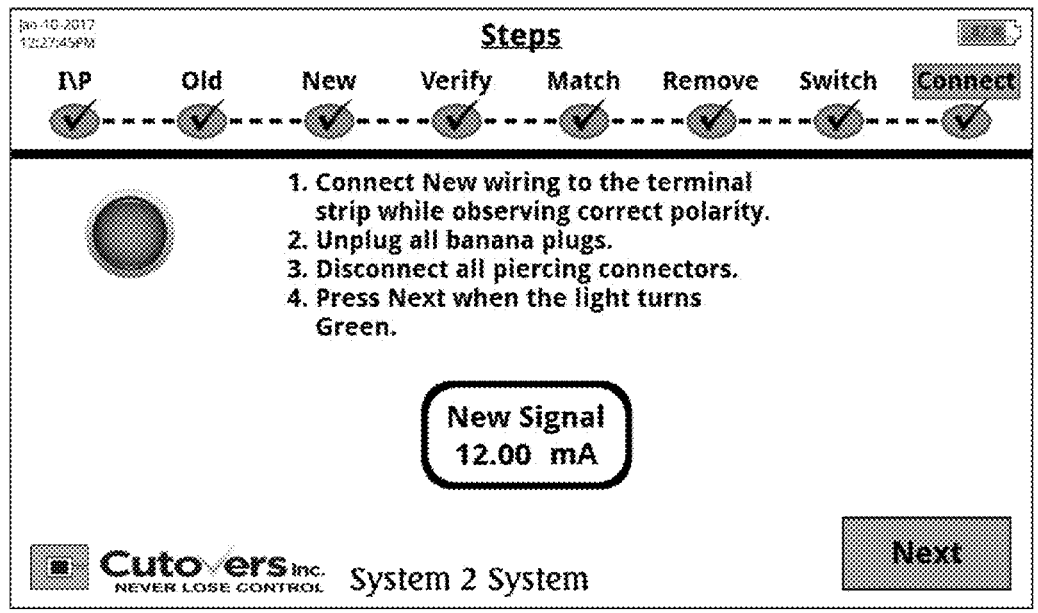

During the connect step, as illustrated at FIG. 17, the operator is typically prompted, such as in display output region 311 and 312, to connect new process control signal wires 17,18 to terminal block 15 and remove all the leads and piercing connectors, Software 205 is used to monitor a set of sensed electrical characteristics and, if the monitored sensed electrical characteristics are within a predetermined set of sensed electrical characteristics, to cause one or more instructions or other prompts to be displayed on display output region 311 indicating to the operator that the new process control signal wires have been successfully connected to terminal block 15 and the leads and connectors have been successfully removed. Once done, software 205 may then display one or more prompts or an alert in display output region 311 and 312 and allow the finish step.

In a first embodiment, existing control system and FCE signals are connected to and switched by an input relay such as input relay 35 with the new process control signals being connected to a cutover relay such as cutover circuit relay 46. In a second embodiment, existing control system and new control system signals can be connected to and switched by an input relay such as input relay 35 with FCE signals connected to a cutover relay such as cutover circuit relay 46. In further contemplated embodiment, FCE and new process control signals are connected to and switched by an input relay such as input relay 35 with existing control signals being connected to a cutover relay such as cutover circuit relay 46.

Figure 18:
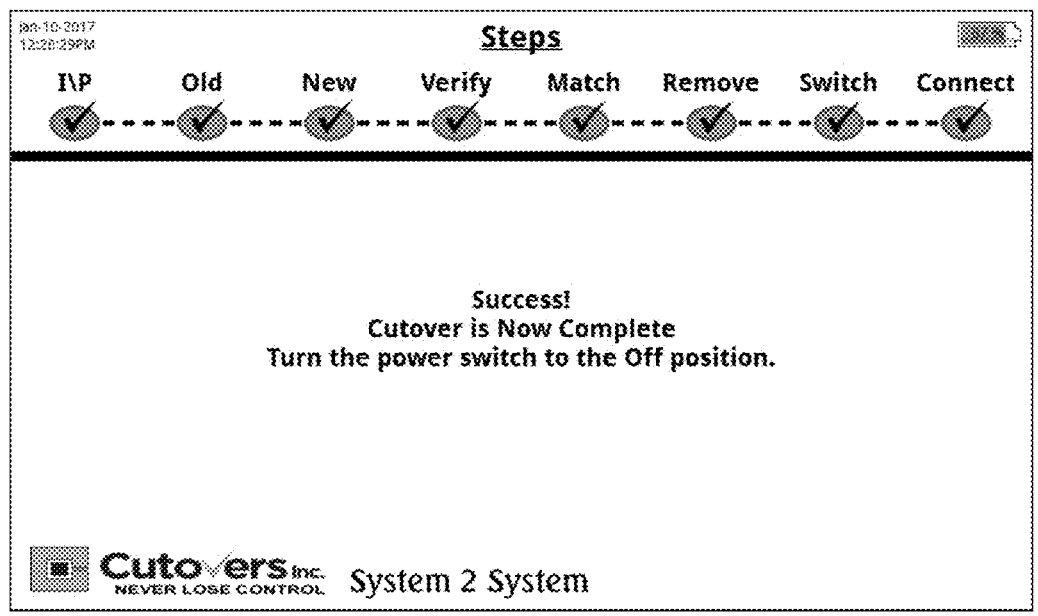
Figure 19:
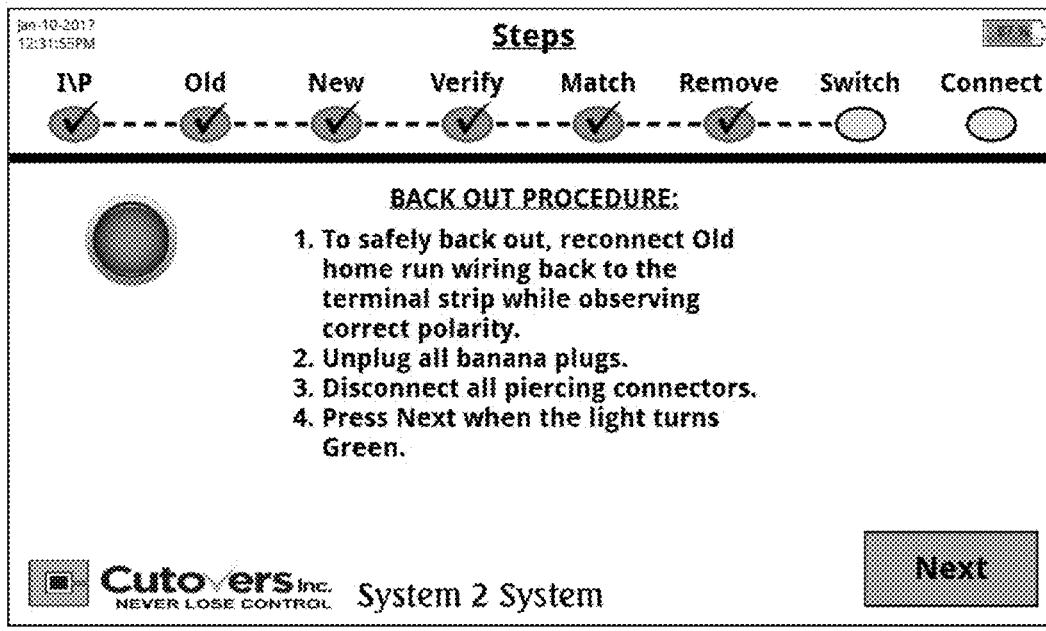
Figure 20:
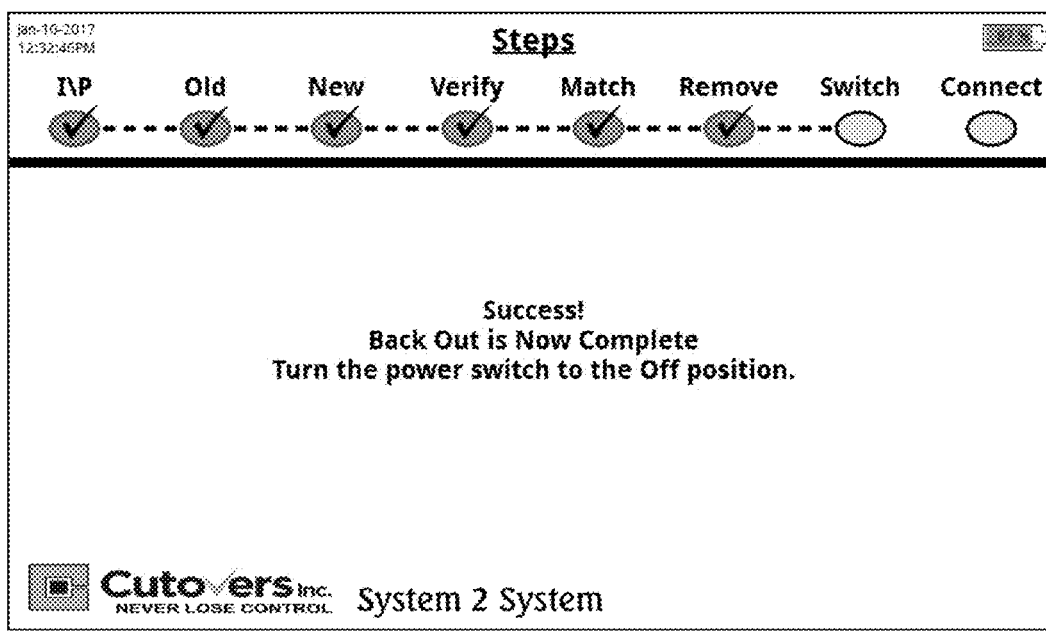
Figure 21:
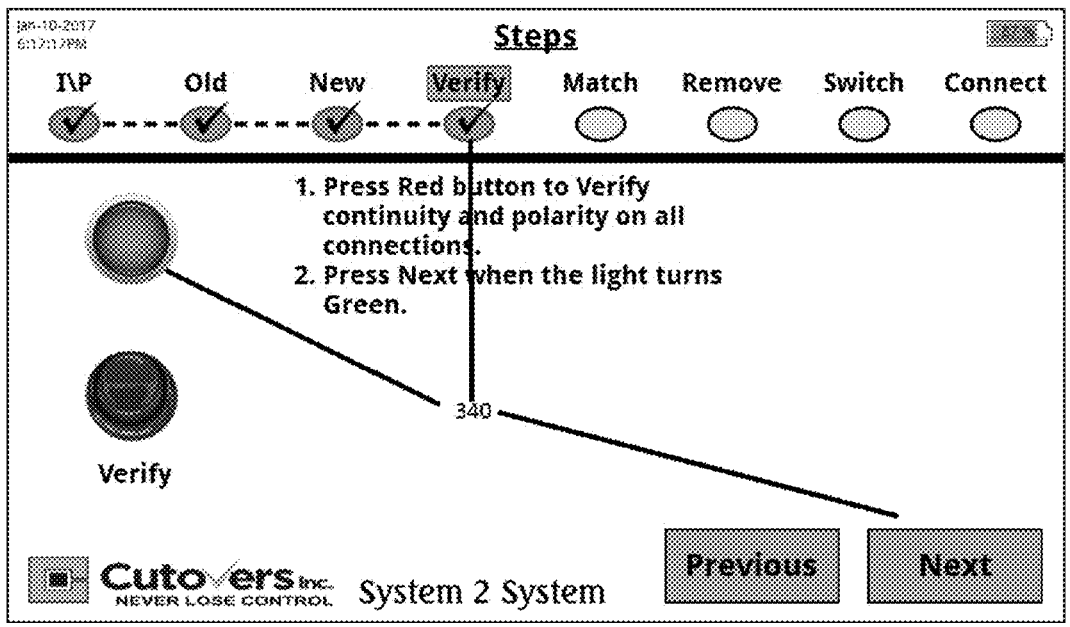
Figure 22:
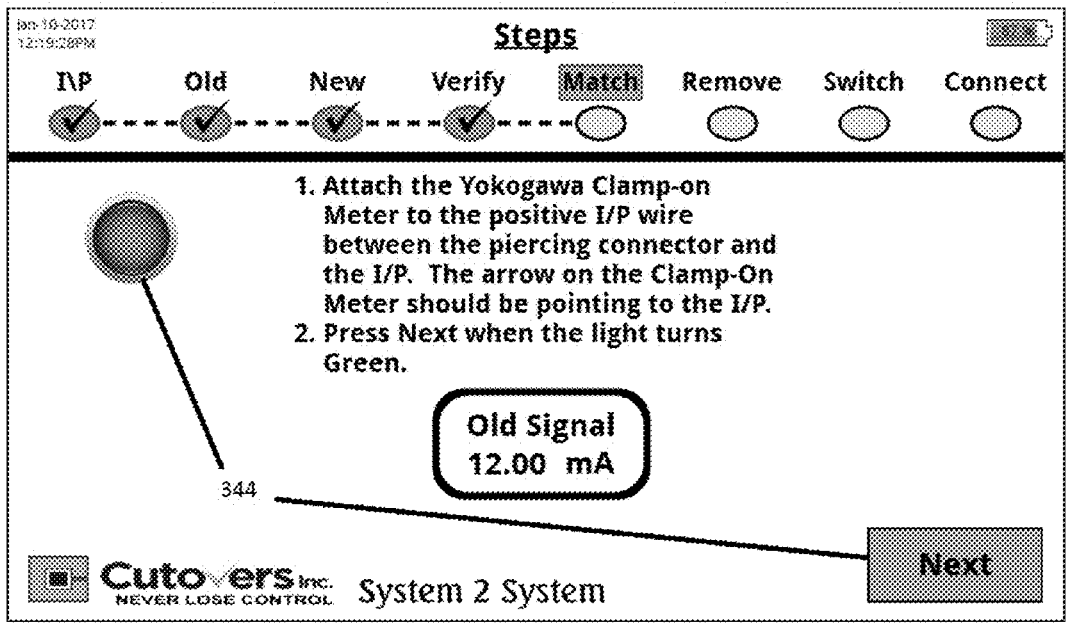
Figure 23:
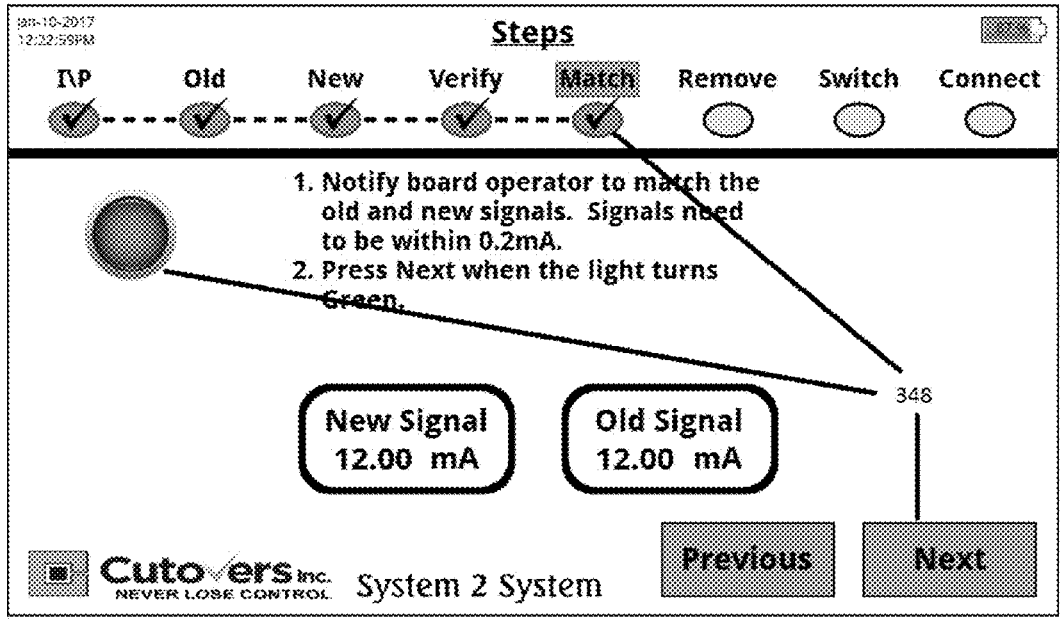
Figure 24:
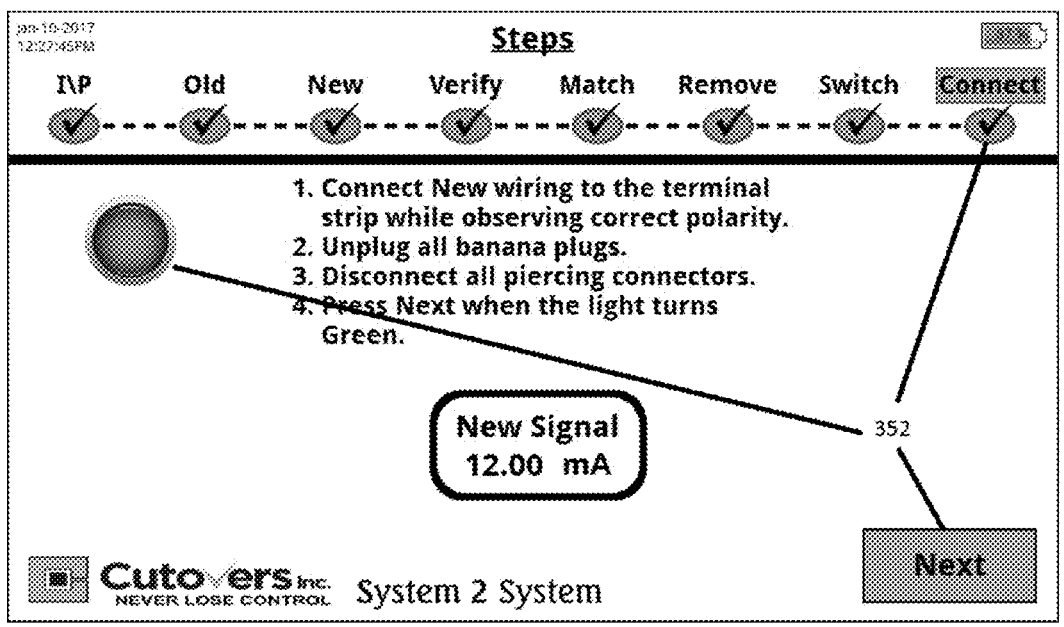

When software 205 determines that all steps have been completed successfully, as illustrated in FIG. 18 a final status set of prompts may be presented.

As illustrated in FIGS. 7-24, one or more prompts may be displayed at output region 311 and an operator input may be required to perform an action via an input region, e.g. at input region 321, before proceeding to a new step. As with most if not all steps, progress may be indicated in an output display region such as output display region 310.

In certain embodiments, the entire decision to allow the operator to progress from step to step is handled exclusively by the logic circuitry, e.g. iteration of hot cutover box 1,100 occurs without display 300. In another embodiment, the decision to allow the operator to progress from step to step is handled by a combination of the logic circuitry and software 205, e.g. iteration of hot cutover box 1,100 with display 300. It is understood that certain, if not all, of the human operator actions described above may be accomplished automatically with appropriate software and interfaces.

In certain embodiments, data logger logic is used to log a predetermined set of data associated with the cutover process. The predetermined set of data may comprise a time stamp for each step executed by software 205, a user identifier, detected continuity and polarity measurement, or the like, or a combination thereof.

In all these embodiments, each alert may comprise a visual indicator on an associated indicator, e.g. an LED such as indicators 401-406 (FIG. 6), and/or a prompt on display 300. Input may be received via input regions 320,321,323 on display 300 or inputs such as 410 (FIG. 6) or 48 (FIG. 1).

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A hot cutover box, comprising:
   a. a housing;
   b. a power supply;
   c. a processor disposed at least partially within the housing and operatively in communication with the power supply, the processor comprising:
      i. a central processing unit (CPU);
      ii. computer memory operatively in communication with the CPU;
      iii. a datastore operatively in communication with the CPU; and
      iv. software operatively resident on the datastore, the software comprising an ordered set of allowable process steps and a corresponding set of process step prerequisites;
   d. a terminal block comprising:
      i. a set of final control element (FCE) connections;
      ii. a set of existing process control signal connections; and
      iii. a set of new process control signal connections;
   e. a first current measurement circuit operatively in communication with the set of new process control signal connections and the processor;

f. a cutover relay operatively in communication with the set of new process control signal connections, the set of existing process control signal connections, and the set of FCE connections;
g. an electrical flow detector circuit operatively connected to the set of FCE connections;
h. a set of processing circuits cooperatively in communication with the software, the set of processing circuits comprising:
  i. a bootup circuit operatively in communication with the power supply, the bootup circuit comprising:
    1. a state sensor operatively in communication with the processor, the set of new process control signal connections, the set of existing process control signal connections, and the set of FCE connections; and
    2. a bootup state circuit operatively in communication with the processor and the state sensor;
  ii. a verification circuit operatively in communication with the power supply, the verification circuit comprising:
    1. a verification circuit latch operatively in communication with the processor, the set of new process control signal connections, the set of existing process control signal connections, the set of FCE connections, and the bootup circuit; and
    2. a verify input relay operatively in communication with the verification circuit latch, the set of new process control signal connections, the set of existing process control signal connections, and the set of FCE connections;
  iii. a removal process circuit operatively in communication with the power supply, the removal process circuit comprising:
    1. a removal logic circuit operatively in communication with the electrical flow detector circuit, the verification circuit latch, and the state sensor; and
    2. a latching removal circuit operatively in communication with the processor;
  iv. a switch circuit operatively in communication with the power supply and the latching removal circuit, the switch circuit comprising a latching switch circuit operatively in communication with the cutover relay, the processor, and the latching removal circuit;
  v. a connection circuit operatively in communication with the power supply, the connection circuit comprising a connection logic circuit operatively in communication with the switch circuit, the processor, the electrical flow detector circuit, and the state sensor; and
  vi. a backout logic circuit operatively in communication with the electrical flow detector circuit, the power supply, the processor and the state sensor;
i. a probe operatively connected to the set of existing process control signal connections intermediate the terminal block and a FCE connection;
j. a process meter operatively connected to the probe and the processor; and
k. a display operatively in communication with the power supply and the software, the display disposed about, and at least partially visible from, an outer portion of the housing, the display operatively connected to the processor, the display comprising:
  i. a plurality of predefined input regions; and
  ii. a plurality of predefined output regions.

2. The hot cutover box of claim 1, wherein the software comprises:

a. sequencer logic configured to separately interrogate each of the set of processing circuits and enable an ordered process step from a set of allowable ordered process steps only when a predetermined condition exists with respect to the set of processing circuits;
b. display logic configured to present a predetermined set of visual indicators within the predefined set of display regions based on a currently allowed ordered process step from the set of ordered process steps; and
c. user input logic configured to accept a user input from a set of selectable user inputs.

3. The hot cutover box of claim 1, wherein the predefined set of input regions comprises:
a. a first input region operative, when in a predetermined state, to allow an operator to proceed to a first predetermined process step and, optionally, provide a visual indicator;
b. a second input region operative to permit energizing the switch circuit when a set of existing process signal leads have been removed from the set of existing process connections; and
c. a third input region operative to de-energize the switch circuit and turn off the cutover relay, thereby allowing the operator to switch back to an existing process control signal.

4. The hot cutover box of claim 1, wherein the predefined set of display regions comprises:
a. a first display region operative to indicate when the verification circuit is energized and an operator is allowed to proceed to a second predetermined process step;
b. a second display region operative to indicate when the meter is connected to the old process control signal and an operator is allowed to proceed to a third predetermined process step;
c. a third display region operative to indicate when the New process control signal and the existing process control signal match and an operator is allowed to proceed to a fourth predetermined process step;
d. a fourth display region operative to indicate when the switch circuit is energized;
e. a fifth display region operative to indicate that energizing the cutover relay is allowed;
f. a sixth display region operative:
  i. to indicate when a set of new process signal leads has been connected to the terminal block and a set of connector leads have been unplugged; and
  ii. to signal that the operator is allowed to proceed to a fifth predetermined process step; and
g. a user prompt display region configured to display a set of user prompts.

5. The hot cutover box of claim 1, further comprising a data transmitter operatively in communication with the processor.

6. The hot cutover box of claim 5, wherein:
a. the data transmitter comprises a data transceiver; and
b. the software further comprises data command logic adapted to receive an instruction via the data transceiver and effect a process step in response to the received instruction.

7. The hot cutover box of claim 6, wherein the data transmitter comprises a wireless data transmitter.

8. The hot cutover box of claim 1, wherein the processor further comprises a data logger operatively in communication with the CPU.

9. The hot cutover box of claim 1, wherein the display comprises a touch sensitive display.

10. The hot cutover box of claim 1, further comprising:
   a. a set of existing process signal leads removably connected to the existing process set of connections;
   b. a set of new process signal leads removably connected to the new process set of connections; and
   c. a set of FCE connection leads removably connected to the FCE set of connections.

11. The hot cutover box of claim 1, further comprising a data port operatively in communication with the CPU.

12. The hot cutover box of claim 11, wherein the data port comprises a USB port or a microSD port.

13. The hot cutover box of claim 1, further comprising a predetermined set of level shifters operatively disposed intermediate the CPU and a predetermined subset of circuits of the set of processing circuits.

14. A hot cutover box, comprising:
   a. a housing;
   b. a power supply;
   c. a processor disposed at least partially within the housing and operatively in communication with the power supply, the processor comprising:
      i. a sequencer; and
      ii. software operatively resident in the sequencer, the software comprising an ordered set of allowable process steps and a corresponding set of process step prerequisites;
   d. a terminal block comprising:
      i. a set of final control element (FCE) connections;
      ii. a set of existing process control signal connections; and
      iii. a set of new process control signal connections;
   e. switching circuitry operatively in communication with the set of FCE connections, the set of existing process control signal connections, the set of new process control signal connections, and the processor, the switching circuitry comprising:
      i. a cutover relay operatively in communication with the set of new process control signal connections, the set of existing process control signal connections, and the set of FCE connections;
      ii. an electrical flow detector circuit operatively connected to the set of FCE connections;
      iii. a verification circuit operatively in communication with the power supply and operative to check a set of input signal characteristics against a predetermined set of parameters;
      iv. a removal process circuit operatively in communication with the power supply, the removal process circuit operative to allow removal of the set of FCE connections, the set of existing process control signal connections, and the set of new process control signal connections;
      v. a latching switch circuit operatively in communication with the cutover relay, the processor, and the latching removal circuit; and
      vi. a connection logic circuit operatively in communication with the switch circuit, the processor, the electrical flow detector circuit, and the state sensor;
   f. a probe operatively connected to the set of existing process control signal connections intermediate the terminal block and a FCE connection;
   g. a display operatively in communication with the power supply, the processor, and the switching circuitry, the display disposed about, and at least partially visible from, an outer portion of the housing, the display comprising a plurality of predefined input regions and a plurality of predefined output regions; and
   h. a set of piercing connectors for corresponding connections of the set of existing process control signal connections, the set of new process control signal connections, and the set of FCE connections.

15. A method of effecting a hot cutover using a hot cutover switch comprising a housing, a power supply, a processor disposed at least partially within the housing and operatively in communication with the power supply where the processor comprises a sequencer and software operatively resident in the sequencer and comprising an ordered set of allow process steps and a corresponding set of process step prerequisites, a terminal block comprising a set of final control element (FCE) connections, a set of existing process control signal connections, and a set of new process control signal connections, switching circuitry operatively in communication with the set of FCE connections, the set of existing process control signal connections, the set of new process control signal connections, and the processor where the switching circuitry comprises a cutover relay operatively in communication with the set of new process control signal connections, the set of existing process control signal connections, and the set of FCE connections, an electrical flow detector circuit operatively connected to the set of FCE connections, a verification circuit operatively in communication with the power supply, a verify input relay, and a state sensor and operative to verify a set of circuit characteristics with respect to a predetermined set of parameters, a removal process circuit operatively in communication with the power supply, the removal process circuit operative to allow removal of one or more of the set of new process control signal connections, the set of existing process control signal connections, and the set of FCE connections, a latching switch circuit operatively in communication with the cutover relay, the processor, and the latching removal circuit, a connection logic circuit operatively in communication with the switch circuit, the processor, the electrical flow detector circuit, and the state sensor, a probe operatively connected to the set of existing process control signal connections intermediate the terminal block and the set of FCE connections, a display operatively in communication with the power supply and disposed about, and at least partially visible from, an outer portion of the housing, the display operatively connected to the processor, the display comprising a plurality of predefined input regions and a plurality of predefined output regions, and a set of piercing connectors for corresponding connections of the set of existing process control signal connections, the set of new process control signal connections, and the set of FCE connections, the method comprising:
   a. connecting a first set of removably connected connectors to wires between an existing terminal block and existing wires operatively connected to an existing final control element (FCE);
   b. using the software to verify electrical continuity and signal polarity on the removably connected connectors and a set of test leads connecting the hot cutover box circuitry to an existing process control signal being supplied to an FCE side of the terminal block;
   c. using the software to determine a predetermined electrical characteristic of the existing process control signal being supplied to the FCE side of the terminal block;
   d. using the software to determine if the existing process control signal being supplied to the FCE side of the terminal block set of electrical connectors is properly connected to the processor;

e. if the existing process control signal being supplied to the FCE side of the terminal block set of electrical connectors are not operatively and properly in communication with the processor, displaying a prompt in a predetermined display region and disallowing further processing; and f. if the existing process control signal being supplied to the FCE side of the terminal block set of electrical connectors are operatively and properly in communication with the processor, displaying a prompt in a predetermined display region and allowing further processing, the further processing comprising:

i. connecting a second set of input connectors to wires between the existing terminal block and wires operatively connected to the existing control system;

ii. using the software to verify electrical continuity and signal polarity on the removably connected connectors and the set of test leads connected to the process signal being supplied to an existing control system side of the terminal block;

iii. if the process control signal being supplied to the existing control system side of the terminal block set of electrical connectors are not operatively and properly in communication with the processor, displaying a prompt in a display region and disallowing further processing; and iv. if the process control signal being supplied to the existing control system side of the terminal block set of electrical connectors are operatively and properly in communication with the processor, displaying a prompt in a display region and allowing further processing, the further processing comprising:

1. connecting a third set of removably connected connectors to the wires from a new control system;

2. using the software to verify electrical continuity and signal polarity on the third set of removably connected connectors;

3. if a process control signal on the third set of removably connected connectors are not operatively and properly in communication with the processor, displaying a prompt in a display region and disallowing further processing; and 4. if the process control signal on the third set of removably connected connectors are operatively and properly in communication with the processor, displaying a prompt in a display region and allowing further processing, the further processing comprising:

a. using the software to monitor a sensed electrical characteristic of the existing process control signal, the new process control signal, and the signal being delivered to the final control element;

b. if the monitored sensed electrical characteristic of the existing process control signal and the new process control signal and the signal being delivered to the final control element is within a predetermined set of sensed electrical characteristics to indicate to an operator that the meter is connected properly and that the existing process control signal and the new process control signals match with respect to the monitored sensed electrical characteristic, displaying a prompt in a display region and allowing further processing, the further processing comprising displaying an instruction to prompt for removal of the existing process control signal connectors from the terminal block;

c. verifying that all power signals are properly operative;

d. when all of the power signals are properly operative, prompting the operator to select a "Switch to New" button; and e. when the "Switch To New" button is selected, moving the control signal being supplied to the FCE from the existing control system to the new control system.

16. The method of claim 15, further comprising:

a. displaying an instruction to connect signal wires from the new process controller to the terminal block and prompt for removal of all of the leads and of the connectors when the monitored sensed electrical characteristic of the existing process control signal and the new process control signal is within a predetermined set of sensed electrical characteristics;

b. making a "Next" button available for user input selection.

17. The method of claim 15, further comprising using a data logger to log a predetermined set of data associated with the cutover process.

18. The method of claim 17, wherein the predetermined set of data comprise a time stamp for each step executed by the sequencer logic or a user identifier associated with a step executed by the sequencer logic.

19. The method of claim 17, wherein the prompts comprise a visual indicator and a prompt presented on the display.

\* \* \* \* \*